(12) United States Patent
Kehrer et al.

(10) Patent No.: US 12,496,224 B2
(45) Date of Patent: Dec. 16, 2025

(54) METHOD FOR PROVIDING CONTROL DATA FOR A LASER OF A TREATMENT APPARATUS

(71) Applicant: SCHWIND eye-tech-solutions GmbH, Kleinostheim (DE)

(72) Inventors: Tobias Kehrer, Kleinostheim (DE); Samuel Arba Mosquera, Aschaffenburg (DE)

(73) Assignee: SCHWIND eye-tech-solutions GmbH, Kleinostheim (DE)

( * ) Notice: Subject to any disclaimer, the term of this patent is extended or adjusted under 35 U.S.C. 154(b) by 299 days.

(21) Appl. No.: 18/315,286

(22) Filed: May 10, 2023

(65) Prior Publication Data

US 2023/0372154 A1 Nov. 23, 2023

(30) Foreign Application Priority Data

May 17, 2022 (DE) ...................... 10 2022 112 322.7

(51) Int. Cl.
*A61F 9/008* (2006.01)
*A61D 1/00* (2006.01)
*A61B 17/00* (2006.01)
*A61B 18/00* (2006.01)

(52) U.S. Cl.
CPC ................ *A61F 9/008* (2013.01); *A61D 1/00* (2013.01); *A61B 2017/0019* (2013.01); *A61B 2018/00684* (2013.01); *A61B 2018/00761* (2013.01); *A61F 2009/00844* (2013.01); *A61F 2009/00872* (2013.01)

(58) Field of Classification Search
CPC .. A61B 2017/0019; A61B 2018/00684; A61B 2018/00761; G16H 20/40; G16H 40/60
See application file for complete search history.

(56) References Cited

U.S. PATENT DOCUMENTS

2020/0330268 A1\* 10/2020 Rathjen .................. A61F 9/008

\* cited by examiner

*Primary Examiner* — Scott Luan
(74) *Attorney, Agent, or Firm* — MEDLER FERRO WOODHOUSE & MILLS PLLC

(57) ABSTRACT

An apparatus and method are disclosed for providing control data for a laser of a treatment apparatus for the correction of a cornea. The method includes determining a look-up table for preset corneal parameters by a corneal deformation model, wherein the cornea can be modeled in deformed and non-deformed states by the corneal deformation model. A value of at least one preset corneal parameter in the non-deformed state of the cornea is varied and an effect of this variation on values of the corneal parameters in the deformed state of the cornea is ascertained for determining the look-up table. The method further includes ascertaining a corneal value to be achieved from predetermined examination data, determining by the look-up table a deformation-corrected corneal value to be achieved for compensating for the deformation of the cornea, and providing control data, which uses the deformation-corrected corneal value for correcting the cornea.

13 Claims, 5 Drawing Sheets

METHOD FOR PROVIDING CONTROL DATA FOR A LASER OF A TREATMENT APPARATUS

FIELD

The present invention relates to a method for providing control data for a laser of a treatment apparatus for the correction of a cornea. In addition, the invention relates to a control device for performing the method, to a treatment apparatus with at least one eye surgical laser and at least one control device, to a computer program and to a computer-readable medium.

BACKGROUND

Treatment apparatuses and methods for controlling lasers for correcting an optical visual disorder of a cornea are known in the prior art. Therein, a pulsed laser and a beam focusing device can for example be formed such that laser beam pulses effect an optical breakthrough in a focus situated within the tissue of the cornea to separate a lenticule from the cornea for correcting the cornea. In the treatment with a treatment apparatus, for example for separating a lenticule, the eye is usually fixed by one or more contact elements of the treatment apparatus. Herein, the contact element is a rigid element, for example a plano-concave lens, which is put onto the eye, in particular onto the cornea, in order that the eye is not moved in the treatment. However, it is disadvantageous in such a contact element that a shape of the cornea changes by the contact element, in particular is compressed. Hereby, the shape of the lenticule to be separated can also change, whereby an originally planned treatment can be erroneous.

Furthermore, the determination, which geometry the lenticule to be removed is to have, is usually performed according to known standard methods, wherein a refractive power to be corrected or a diopter value is for example preset hereto, by means of which the lenticule to be removed can then be determined. In particular the "collapse" or closure of the cornea after removing the lenticule herein results in the desired correction. However, in the determination of the correction of the cornea, in particular in a refractive power correction, which is performed according to standard methods, slight deviations from the actually planned result can occur since an idealized cornea is assumed upon closing the cornea.

The above mentioned deformation effects of the cornea, in particular due to the contact element or by the not exactly modelled closure of the cornea after removing the lenticule, can result in undesired deviations of the treatment result upon a cumulation of these errors. Therefore, one strives to consider and compensate for these effects in advance, wherein the determination of this compensation is often very complicated and time consuming.

SUMMARY

Therefore, the invention is based on the object to simplify a compensation for the deformation effects of the cornea.

This object is solved by the method according to the invention, the apparatuses according to the invention, the computer program according to the invention as well as the computer-readable medium according to the invention. Advantageous configurations with convenient developments of the invention are specified in the respective dependent claims, wherein advantageous configurations of the method are to be regarded as advantageous configurations of the treatment apparatus, of the control device, of the computer program and of the computer-readable medium and vice versa.

A first aspect of the invention relates to a method for providing control data for a laser of a treatment apparatus for the correction of a cornea of a human or animal eye, wherein the method comprises the following steps performed by a control device. Therein, an appliance, an appliance component or an appliance group is understood by a control device, which is configured for receiving and evaluating signals as well as for providing, for example generating, control data. For example, the control device can be configured as a control chip, computer program, computer program product or control appliance. In the method, determining a look-up table for preset corneal parameters by means of a corneal deformation model for compensating for a deformation of the cornea is effected by the control device, wherein the cornea can be modeled in a deformed and non-deformed state by the corneal deformation model, wherein a value of at least one preset corneal parameter in the non-deformed state of the cornea is varied and an effect of this variation on values of the corneal parameters in the deformed state of the cornea is ascertained for determining the look-up table.

In other words, a look-up table can first be ascertained, wherein the values of the look-up table can be calculated or simulated by means of a corneal deformation model. Alternatively, a provision of the look-up table from empirical values from preceding applications of the corneal deformation model would also be possible. The corneal deformation model allows modeling the cornea in a deformed and a non-deformed state. Thus, the deformation by a contact element and/or the closure of the cornea after removing the lenticule and the deformation associated therewith by collapse of the residual corneal layers can for example be modelled. This means that a value (corneal value) of a corneal parameter, for example a radius of curvature of the cornea, in the non-deformed state can be preset and it can be ascertained by means of the corneal deformation model, which effect the deformation of the cornea has on this and the further corneal values of the corneal parameters and thereby on a planned treatment result. Corneal parameters can for example include geometries of the cornea and/or of the lenticule to be separated, which can change before and after the deformation. The deformation or the degree of the deformation can be predetermined or preset, for example by a known radius of curvature of a contact element. For example, the contact element can have a plano-concave shape, a plano-parallel shape or a convex-concave shape.

For determining the look-up table, at least one preset corneal parameter, preferably multiple corneal parameters, can be varied, wherein the respective values of the further corneal parameters, which are ascertained for the deformed and preferably also the non-deformed state of the cornea, are stored for each variation, in particular in which proportion the respective values in the deformed and non-deformed state change to each other. For example, a corneal parameter can be the radius of curvature of the anterior corneal surface, for which a first value, for example 7 mm, is first assumed. With the corneal deformation model, it can then be determined how the further corneal parameters, for example the radius of curvature of the anterior interface of the lenticule, change upon a deformation of the cornea if the first value is assumed as an initial point, wherein this change or effect can be stored in the look-up table. Next, the radius of curvature of the anterior corneal surface can be varied, which means that a second value, for example 8 mm, is assumed and the corresponding values are subsequently again stored in the look-up table. This variation can preferably be performed for multiple values, in particular a preset range of values, to determine the look-up table.

As the corneal deformation model, each model can be used, which can describe the cornea and in particular the corneal parameters in the deformed and non-deformed state, wherein the cornea is preferably described as a volume body as the corneal deformation model, which is deformed based on the Euler-Bernoulli beam theory, to ascertain the respective corneal parameters and the effects on the corneal values. A corneal deformation model, which is based on the Euler-Bernoulli beam theory, has proven to be particularly suitable for reproducing these deformation effects. The control device, which is provided for determining the look-up table, can belong to the treatment apparatus or be a control device separate from the treatment apparatus. If the control device is separate from the treatment apparatus, the look-up table can preferably be subsequently stored in the control device of the treatment apparatus.

Subsequently, ascertaining a corneal value to be achieved from predetermined examination data, which at least one of the preset corneal parameters is to take by the treatment with the treatment apparatus, and a preoperative value of the at least one preset and varied corneal parameter, which the cornea to be treated has before the treatment in the non-deformed state, is effected in the method. Furthermore, determination of a deformation-corrected corneal value to be achieved for at least the one preset corneal parameter, which is required for generating the corneal value to be achieved considering the deformation of the cornea, depending on the look-up table and the preoperative value of the at least one preset and varied corneal parameter, and providing control data for controlling the laser, which uses at least the deformation-corrected corneal value to be achieved of the at least one preset corneal parameter for correction of the cornea, are effected.

This means that the treatment planning for an individual cornea can be performed after ascertaining the look-up table, in that a corneal value to be achieved for a patient is first ascertained from predetermined examination data, which one of the corneal parameters is to take by the treatment with the treatment apparatus. This ascertainment of the corneal value to be achieved does not have to be performed directly subsequent to the determination of the look-up table, but can occur at any time thereafter. In addition, it can be ascertained from the examination data, which geometry or which preoperative value of the corneal parameter the cornea to be treated actually has, wherein the corneal parameter of the preoperative value is preferably that one, which was varied for the look-up table in the deformed and non-deformed state.

With the aid of the look-up table, it can subsequently be determined how the corneal value to be achieved has to be adapted to obtain this corneal value to be achieved assuming that the cornea is deformed during the treatment. Thus, it can be read in the look-up table at the ascertained preoperative value of the varied corneal parameter how the corneal values of the further corneal parameters, in particular the corneal value to be achieved, change upon the deformation of the cornea, which has the preoperative value.

Thus, in the look-up table, preferably for a plurality of preoperative values of different corneal parameters, for example a refractive power correction, an optical zone, a lenticule diameter, an incision angle and/or a distance between an anterior corneal surface and an anterior interface of the lenticule, the respective deformation-corrected corneal values of all of the respectively further corneal parameters can be read out, which are required for achieving the deformation correction. For example, the preoperative value, which the actual cornea has as the corneal parameter, can be a radius of curvature of the anterior corneal surface of 9 mm and the corneal value to be achieved can be a refractive power correction of −5 diopters. In the look-up table, by means of the corneal deformation model for multiple radii of curvature of the anterior corneal surface, for example for radius of curvature of 6 mm, 7 mm, 8 mm, 9 mm and 10 mm, it can be stored, which effect a preset deformation of the cornea has on the refractive power correction at the respective radius of curvature. Thus, in this example, it can be read in the look-up table at radius of curvature of 9 mm, to which refractive power value the originally planned −5 diopters have to be modified to consider the deformation. For example, a compensation value of 1.08 can be indicated in the look-up table under radius of curvature of 9 mm, by which the −5 diopters have to be multiplied to obtain the actually planned refractive power correction. That is, −5.4 diopters have to be planned for the refractive power correction to be achieved.

The above indicated example is only to serve for clarification and the method, in particular the look-up table, is not to be limited only to the radius of curvature and the refractive power correction. Further corneal parameters can also be ascertained for the look-up table, in particular among each other, wherein the expert selects suitable corneal parameters for the correction of a cornea. The method either is not limited to the multiplication/division by a compensation value, but the look-up table can provide respective absolute values and/or difference values, with which the corneal value to be achieved can be replaced and/or added/subtracted.

Finally, the thus determined corneal values of the respective corneal parameters can be provided as control data for controlling the laser, wherein the deformation effects are taken into account in the control data. The control data can for example be determined and provided, respectively, for ablative methods, photodisruptive methods, in particular for a lenticule extraction, crosslinking methods of the cornea (Crosslinking; CXL) and/or a method for laser-induced refractive index change (LIRIC).

By this aspect of the invention, the advantage arises that deformation effects can be easily compensated for and thus better results can be achieved in the treatment. Furthermore, an expensive and complex calculation or simulation, which describes a change of the coordinate system, does not have to be individually performed for each patient.

The invention also includes forms of configuration, by which additional advantages arise.

A form of configuration provides that the corneal deformation model is based on the Euler-Bernoulli beam theory. In other words, the cornea can be described as a volume body, which deforms based on the Euler-Bernoulli beam theory, to describe the deformed cornea. The Euler-Bernoulli beam theory describes an elastic bending of a body, wherein it is assumed that multiple central corneal surfaces are arranged between an anterior corneal surface and a posterior corneal surface, which constitute the volume body. According to the Euler-Bernoulli beam theory, one of the central corneal surfaces is a neutral corneal surface or neutral membrane, the surface of which remains constant upon the deformation, wherein the further central corneal surfaces can be described depending on the neutral corneal surface. In modeling the deformation by the contact element, the central corneal surfaces below the neutral corneal surface can for example be compressed and those above are stretched. In modeling the closure of the cornea after removing the lenticule, the corneal surfaces, which are situated above the lenticule, can be stretched. Based on the Euler-Bernoulli beam theory, it can be mathematically calculated how the central corneal surfaces change upon an elastic deformation, in particular in relation to the neutral corneal surface. The use of the Euler-Bernoulli beam theory as the corneal deformation model has proven to be particularly suitable since it particularly exactly describes the deformation of the cornea. Thus, improved corneal values for the respective corneal parameters can also be modeled and stored in the look-up table.

In a further form of configuration, it is provided that a value of the at least one preset corneal parameter is varied within a preset range of values for determining the look-up table, wherein the range of values comprises default values of the corneal parameter. In other words, a value of a respective corneal parameter can be varied within a range of values, which comprises default values, for determining the look-up table, wherein the default values can for example be known from a patient collective. Thus, only values for the respective corneal parameter can preferably be taken into account, which usually occurs in a patient's eye. Particularly preferably, not all of the values from this range of values are examined by means of the corneal deformation model, but only a preset number of supporting points, which allows a sufficiently exact determination of the compensation for the deformation. By this form of configuration, an extent of the look-up table can be limited.

Preferably, it is provided that a fit function, in particular a second order polynomial, is adapted to the ascertained values of the corneal parameters for determining the look-up table. Thus, only a finite number of corneal values can for example be determined in the look-up table for a corneal parameter, for example five to twenty values, which are in the range of values of the default values. The values, which are between these supporting points, can then for example be ascertained in that the present values are fitted by means of a fit function, wherein a second order polynomial has here proven to be suitable. Thus, the advantage arises that not all of the values have to be examined in the corneal deformation model, but that it can be assumed that the non-ascertained intermediate values can be suitably mapped by the fit function. Thus, an effort in the determination of the look-up table can be reduced.

Particularly preferably, it is provided that the corneal parameters include a radius of curvature of an anterior corneal surface and/or an optical distance between the anterior corneal surface and a posterior corneal surface and/or a thickness of the cornea and/or a radial distance from a limbus to a center of the cornea and/or an optical distance between the anterior corneal surface and an anterior interface of the lenticule to be separated and/or a radius of the anterior interface of the lenticule to be separated and/or a transition zone and/or a thickness of the lenticule and/or a planned refractive power correction and/or a radius of curvature of a contact element and/or a relative thickness of the cornea and/or an incision angle of an incision cut. The above mentioned corneal parameters are in particular those parameters, which can change by the deformation of the cornea and which are preferably compensated for.

In an advantageous form of configuration, it is provided that a planned refractive power correction and/or a planned lenticule diameter are adapted by the look-up table. In other words, anterior and posterior interfaces of a lenticule can be determined by means of a planned refractive power correction, thus a diopter value, which is to be compensated for. This planned refractive power correction can be scaled by means of the look-up table, which has been ascertained by the corneal deformation model, or be calculated from the look-up table by means of a differential amount, to obtain a global transformation of the refractive power correction. Preferably, a single value can be ascertained from the look-up table, by means of which the planned refractive power correction is adapted. Alternatively or additionally, a lenticule diameter can be planned, in particular a diameter of an optical zone and a size of the correction, respectively, for the correction of the cornea. By means of the look-up table, the planned lenticule diameter can then be adapted via a scaling or a differential amount, to obtain the deformation correction. By this form of configuration, the advantage arises that a user, who plans a refractive power correction and/or a lenticule diameter, can simply adapt it by means of the look-up table to obtain a global transformation.

In a further form of configuration, it is provided that a compensation value is provided from the deformed and non-deformed state of the cornea by the look-up table for each corneal parameter, wherein the respective corneal parameters are multiplied and/or added by means of the compensation value for determining the respective corneal values for compensating for the deformation of the cornea. In this context, dividing is also to be understood by multiplying and subtracting is also to be understood by adding. In other words, an individual compensation value can thus be derived from the look-up table for each corneal parameter, by means of which the respective corneal value of the respective corneal parameter is adapted for compensating for the deformation.

Preferably, it is provided that a deformation of the cornea, which is generated by a contact element, is compensated for by means of the look-up table, and/or wherein a deformation of the cornea, which is generated upon closing the cornea after removing a lenticule from the cornea, is compensated for by means of the look-up table. These two deformations represent the most frequent cause of an erroneous treatment due to deformation effects, wherein they can be compensated for with the aid of the look-up table.

A second aspect of the present invention relates to a control device, which is configured to perform the above described method. The above cited advantages arise. For example, the control device can be configured as a control chip, control appliance or application program ("app"). The control device can preferably comprise a processor device and/or a data storage. By a processor device, an appliance or an appliance component for electronic data processing is understood. For example, the processor device can comprise at least one microcontroller and/or at least one microprocessor. Preferably, a program code for performing the method according to the invention can be stored on the optional data storage. Then, the program code can be adapted, upon execution by the processor device, to cause the control device to perform one of the above described embodiments of the method according to the invention. Furthermore, the control device can comprise multiple control units, in particular a first control unit, which is formed for calculating the look-up table and can be formed independently of the treatment apparatus, and a second control unit, which is formed for determining the deformation-corrected corneal value to be achieved by means of the look-up table and providing the control data, wherein the second control unit is preferably arranged in the treatment apparatus. In other words, the control unit in the treatment apparatus can preferably only include the look-up table, which has been provided by the first control unit.

A third aspect of the present invention relates to a treatment apparatus with at least one eye surgical laser for the separation of a lenticule with predefined interfaces from a human or animal eye by means of optical breakthroughs and/or ablation, and with at least one control device for the laser or lasers, which is formed to execute the steps of the method according to the first aspect of the invention. Preferably, the above mentioned two control units are provided for the treatment apparatus.

In a further advantageous configuration of the treatment apparatus according to the invention, the laser can be suitable to emit laser pulses in a wavelength range between 300 nm and 1400 nm, preferably between 900 nm and 1200 nm, at a respective pulse duration between 1 fs and 1 ns, preferably between 10 fs and 10 ps, and a repetition frequency of greater than 10 kilohertz (kHz), preferably between 100 kHz and 100 Megahertz (MHz). The use of such lasers in the method according to the invention additionally has the advantage that the irradiation of the cornea does not have to be effected in a wavelength range below 300 nm. This range is subsumed by the term "deep ultraviolet" in the laser technology. Thereby, it is advantageously avoided that an unintended damage to the cornea is effected by these very short-wavelength and high-energy beams. Photodisruptive and/or ablative lasers of the type used here usually input pulsed laser radiation with a pulse duration between 1 fs and 1 ns into the corneal tissue. Thereby, the power density of the respective laser pulse required for the optical breakthrough can be spatially narrowly limited such that a high incision accuracy is ensured in the generation of the interfaces. In particular, the range between 700 nm and 780 nm can also be selected as the wavelength range.

In further advantageous configurations of the treatment apparatus according to the invention, the control device can comprise at least one storage device for at least temporary storage of at least one control dataset, wherein the control dataset or datasets include(s) control data for positioning and/or for focusing individual laser pulses in the cornea; and can comprise at least one beam device for beam guidance and/or beam shaping and/or beam deflection and/or beam focusing of a laser beam of the laser.

Further features and the advantages thereof can be taken from the descriptions of the first inventive aspect, wherein advantageous configurations of each inventive aspect are to be regarded as advantageous configurations of the respectively other inventive aspect.

A fourth aspect of the invention relates to a computer program including commands, which cause the control device according to the second inventive aspect to execute the method steps according to the first inventive aspect.

A fifth aspect of the invention relates to a computer-readable medium, on which the computer program according to the fourth inventive aspect is stored. Further features and the advantages thereof can be taken from the descriptions of the first to fourth inventive aspects, wherein advantageous configurations of each inventive aspect are to be regarded as advantageous configurations of the respectively other inventive aspect.

BRIEF DESCRIPTION OF THE DRAWINGS

Further features of the invention are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations without departing from the scope of the invention. Thus, implementations are also to be considered as encompassed and disclosed by the invention, which are not explicitly shown in the figures and explained, but arise from and can be generated by separated feature combinations from the explained implementations. Implementations and feature combinations are also to be considered as disclosed, which thus do not comprise all of the features of an originally formulated independent claim. Moreover, implementations and feature combinations are to be considered as disclosed, in particular by the implementations set out above, which extend beyond or deviate from the feature combinations set out in the relations of the claims.

In the figures, identical or functionally identical elements are provided with the same reference characters.

DETAILED DESCRIPTION

Figure 1:
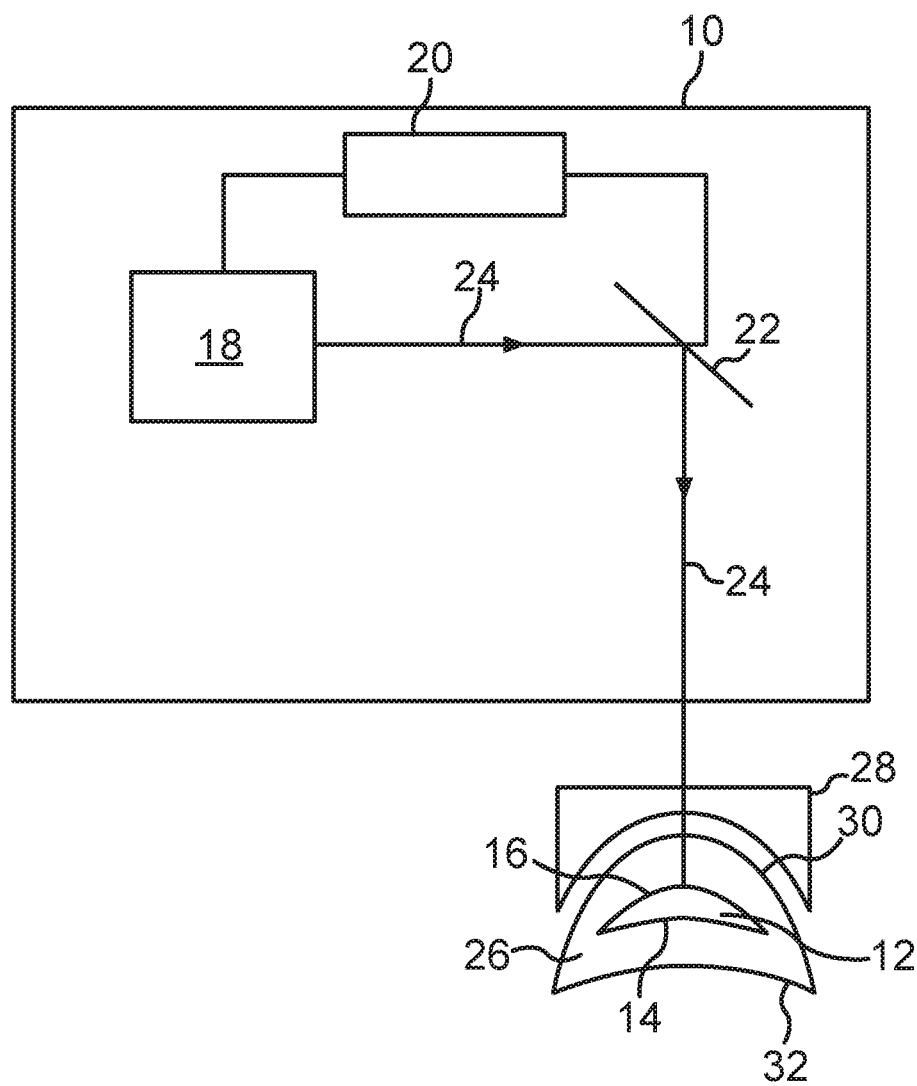
FIG. 1 depicts a schematic representation of a treatment apparatus according to an exemplary embodiment.

FIG. 1 shows a schematic representation of a treatment apparatus 10 with an eye surgical laser 18 for the separation of a lenticule 12 defined by control data from a cornea 26 by means of photodisruption and/or ablation, wherein the cornea 26 is bounded by an anterior corneal surface 30 and a posterior corneal surface 32 in the direction of an optical axis. For separating the lenticule 12, a posterior interface 14 and an anterior interface 16 of the lenticule 12 are preset in the control data, on which a cavitation bubble path for separating the lenticule 12 from the cornea 26 can be generated. One recognizes that a control device 20 for the laser 18 can be formed besides the laser 18 such that it can emit pulsed laser pulses for example in a predefined pattern for generating the interfaces 14, 16. Alternatively, the control device 20 can be a control device 20 external with respect to the treatment apparatus 10.

Furthermore, FIG. 1 shows that the laser beam 24 generated by the laser 18 is deflected towards the cornea 26 by means of a beam device 22, namely a beam deflecting device such as for example a rotation scanner. The beam deflecting device 22 is also controlled by the control device 20 to generate the interfaces 14, 16, preferably also incisions or cuts, along preset incision courses.

The illustrated laser 18 can preferably be a photodisruptive and/or ablative laser, which is formed to emit laser pulses in a wavelength range between 300 nm and 1400 nm, preferably between 700 nm and 1200 nm, at a respective pulse duration between 1 fs and 1 ns, preferably between 10 fs and 10 ps, and a repetition frequency of greater than 10 kHz, preferably between 100 kHz and 100 MHz. Optionally, the control device 20 additionally comprises a storage device (not illustrated) for at least temporary storage of at least one control dataset, wherein the control dataset or datasets include(s) control data for positioning and/or for focusing individual laser pulses in the cornea. The position data and/or focusing data of the individual laser pulses, that is the lenticule geometry of the lenticule 12 to be separated, are generated based on predetermined control data, in particular from a previously measured topography and/or pachymetry and/or the morphology of the cornea or of the optical visual disorder correction to be generated.

For determining the visual disorder data, which can for example indicate a value in diopters, suitable examination data for describing the visual disorder can be received by the control device 20 from a data server or the examination data can be directly input into the control device 20.

Further, a contact element 28 can be provided, which can belong to the treatment apparatus 10. Alternatively, the contact element 28 can also be provided separately from the treatment apparatus 10. The contact element 28, which can also be referred to as patient interface or fixing system, serves to fix the eye or the cornea 26 for the treatment. Hereto, the contact element 28 can comprise a planoconcave lens, which is adapted to the cornea 26 for fixing. By fixing by means of the contact element 28, however, it can occur that the cornea 26 deforms and thus the geometry of the lenticule 12 does no longer have the originally planned dimensions. Therefore, it can occur that a planned refractive power value or refractive power value to be corrected for example deviates from an achieved refractive power value after the treatment with the treatment apparatus 10.

Figure 2:
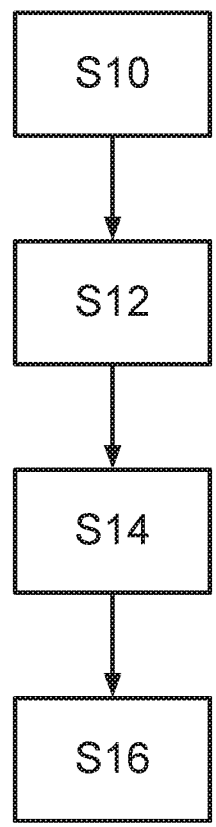
FIG. 2 depicts a schematic method diagram for providing control data according to an exemplary embodiment.

In FIG. 2, a schematic method diagram for providing control data for the laser 18 of the treatment apparatus 10 is illustrated, which can for example be performed by the control device 20. In a step S10, a look-up table for preset corneal parameters can first be determined by means of a corneal deformation model, wherein the corneal deformation model can describe the cornea 26 as a volume body, and which is preferably based on the Euler-Bernoulli beam theory. Thus, the cornea 26 can be modeled in a deformed and non-deformed state, wherein a value of at least one corneal parameter in the non-deformed state of the cornea is varied and an effect of this variation on values of the further corneal parameters in the deformed state is ascertained for determining the look-up table.

Figure 3A:
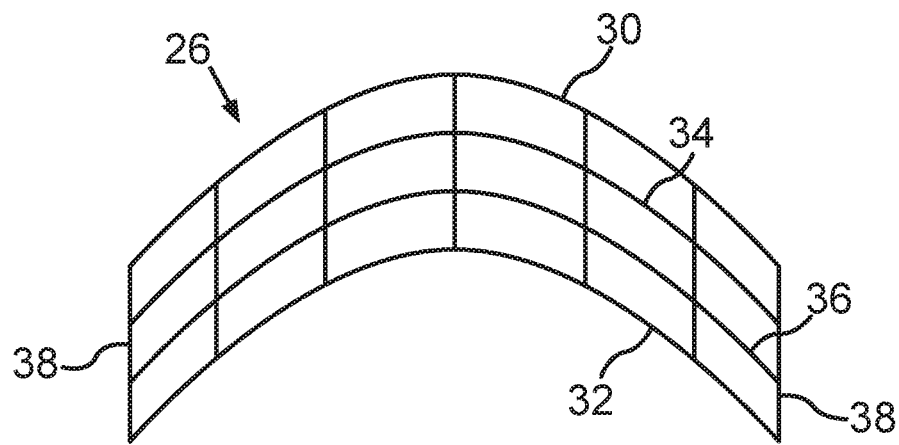
FIG. 3a depicts a schematically illustrated cornea of the corneal deformation model in the non-deformed state.
Figure 3B:
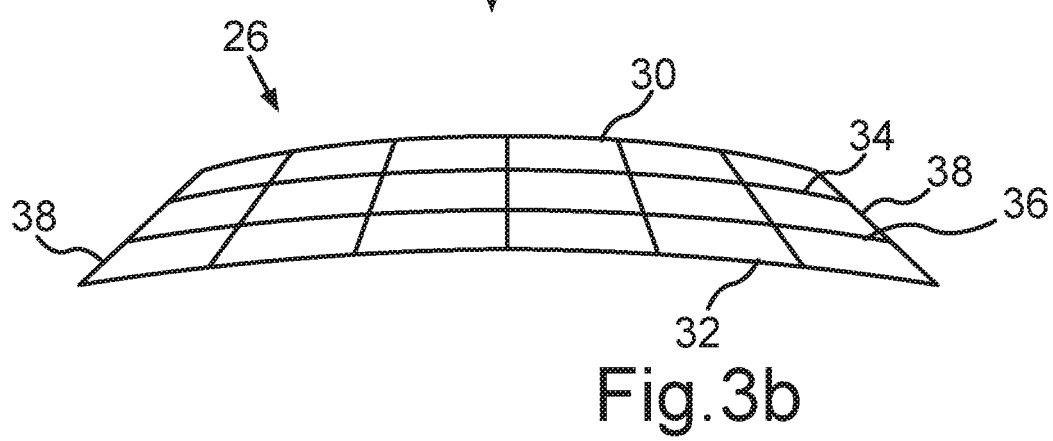
FIG. 3b depicts the cornea of the corneal deformation model deformed by a contact element.
Figure 4A:
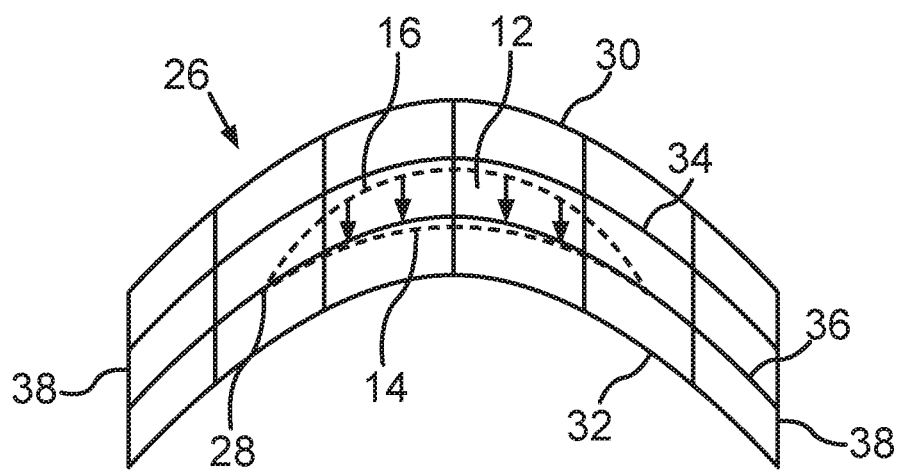
FIG. 4a depicts a schematically illustrated cornea of the corneal deformation model in the non-deformed state before removal of a lenticule.
Figure 4B:
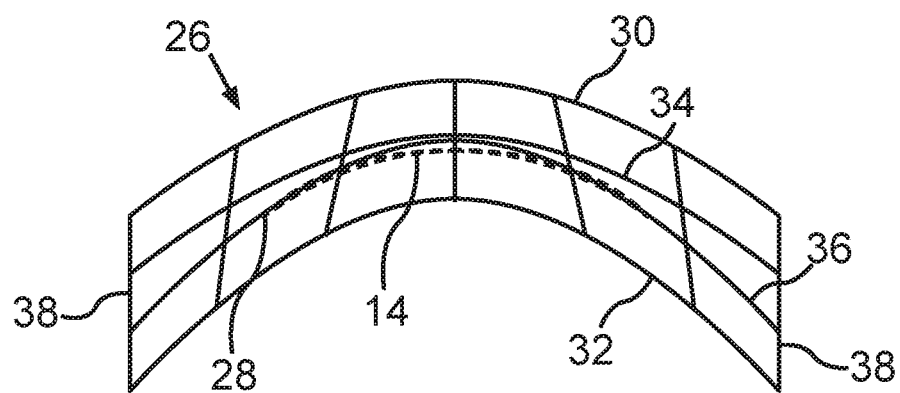
FIG. 4b depicts the deformed cornea of the corneal deformation model after closing the lenticule.

For illustrating the corneal deformation model, the deformation of the volume body of the cornea 26 is shown for the deformation by the contact element 28 in FIGS. 3a and 3b and is shown for the deformation, which occurs in closing the cornea 26 after removing the lenticule 12 in FIGS. 4a and 4b.

Herein, FIG. 3a for example shows the volume body of the cornea 26 in a free state before the deformation by the contact element 28, which is not illustrated in this figure. Therein, the volume body can be bounded by the anterior corneal surface 30 and the posterior corneal surface 32 in the direction of the optical axis and by lateral interfaces 38 in radial direction (lateral). Herein, the anterior corneal surface 30 and the posterior corneal surface 32 can be provided as ellipsoids, wherein a two-dimensional cross-section through the volume body is shown in this figure for illustration and the volume body can be present in a three-dimensional shape, in particular rotationally symmetrical. Besides the anterior and posterior corneal surfaces 30, 32, central corneal surfaces 34, 36 of the volume body are also illustrated, wherein a central corneal surface can be provided within the volume body for each position in z-direction (direction of the optical axis), which is not shown here for reasons of clarity. One of the central corneal surfaces, for example the central corneal surface 36, can be a neutral corneal surface or neutral membrane, which has the same surface before and after the deformation according to the Euler-Bernoulli beam theory, which is taken into account in modeling the cornea 26 based on the corneal deformation model. Preferably, a respectively central corneal surface 34 can be described in relation to this neutral corneal surface in the corneal deformation model.

Thus, a radius of curvature of a respectively central corneal surface 34 can preferably be described by means of the corneal deformation model according to the formula $$\frac{1}{r_{cent,pre}} = \left(\frac{q}{r_{ca}} + \frac{1-q}{r_{cp}}\right)$$

wherein it provides the radius of curvature of the central corneal surface 34 before the deformation ($r_{cent,pre}$). Therein, $r_{ca}$ describes the radius of curvature of the anterior corneal surface 30 and $r_{cp}$ describes the radius of curvature of the posterior corneal surface 32. The variable q describes a relative position of the central corneal surface 34 to the neutral corneal surface 36, wherein q can take a value between 0 and 1.

In similar manner, a position in z-direction, which is dependent on the radial position, can also be described to the radius of curvature, wherein the z-direction extends in the direction of the optical axis. It can be described for the respective central corneal surface 34 with the formula $$z_{cent,pre}(r_x) = (q-1)d_{cc} - \frac{r_x^2}{2}\left(\frac{q}{r_{ca}} + \frac{1-q}{r_{cp}}\right)$$

wherein $r_x$ describes a radial position starting from the center of the cornea 26 and $d_{CC}$ describes a central thickness of the cornea 26 at the highest point or inflection point of the cornea 26.

Upon the deformation of the cornea 26 by the contact element 28, it can be provided in the corneal deformation model that the radius of curvature of the anterior corneal surface 30 is adapted to a radius of curvature of the contact element 28. This situation is for example illustrated in FIG. 3b, wherein the contact element 28 is not shown here for reasons of clarity. It is seen that the anterior corneal surface 30 is impressed and thus also the central corneal surfaces 34 and 36. However, according to the Euler-Bernoulli beam theory, it further remains considered that the neutral corneal surface 36 has the same surface as before the deformation. In this deformation, it is assumed that the volume body can freely deform and is not bounded towards the sides.

In FIG. 4a, the cornea 26 is illustrated in a non-deformed state before the removal of the lenticule 12. Here too, the cornea 26 can be modeled as a volume body, which is formed of respective central corneal surfaces 34, 36, wherein the anterior interface 16 of the lenticule is pressed onto the posterior interface 14 of the lenticule 12 for determination of the deformed cornea in the corneal deformation model, whereby they change the curvatures of the corneal surfaces 30, 34 situated above. Therein, the corneal deformation model is based on the same principles and formulas as already described to the FIGS. 3a and 3b.

In the deformation of the cornea 26 by closing the area of the lenticule 12, it can be provided in the corneal deformation model that the radius of curvature of the anterior interface 16 is adapted to a radius of curvature of the anterior interface 14 such that the cornea 26 according to FIG. 4b results. Herein, the anterior interface 16 can move downwards to the posterior interface 14, wherein the corneal surfaces situated above the anterior interface are thus also adapted, in particular the neutral corneal surface 34 and the anterior corneal surface 30.

Figure 5:
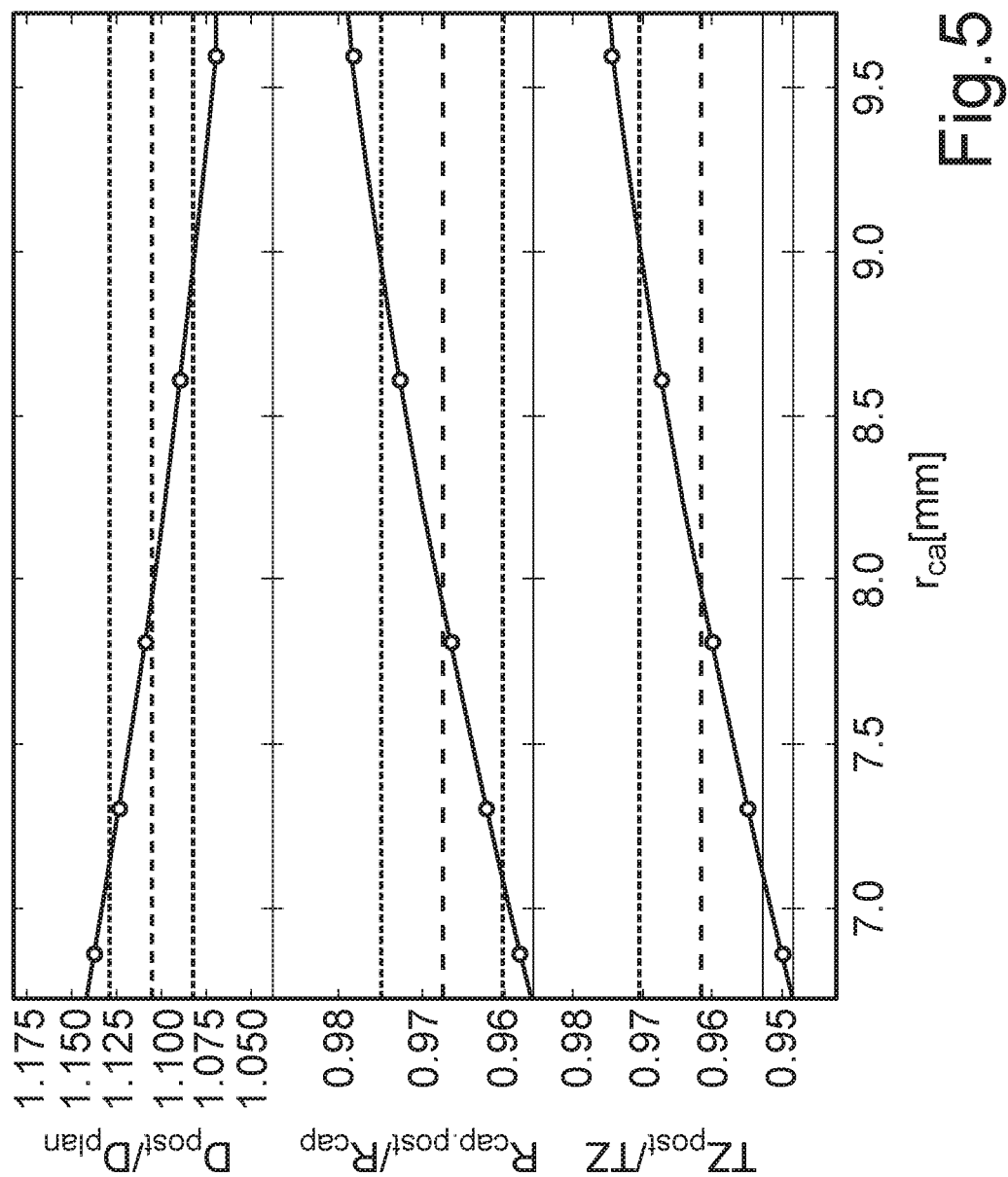
FIG. 5 depicts an exemplary representation of a varied corneal parameter.

In FIG. 5, an exemplary variation of corneal parameters for determining the look-up table by means of the corneal deformation model is illustrated. In this exemplary graphic, an effect of a deformation of the cornea 26 by the contact element 28 is shown, wherein the corneal parameter $r_{ca}$ is represented on the x-axis, which represents a radius of curvature of the anterior corneal surface 30. This corneal parameter $r_{ca}$ is varied within a preset range of values, which preferably comprises default values of the corneal parameter from a patient collective, and the effect of this variation on further corneal parameters, which are represented on the y-axis of FIG. 5, is ascertained. In this example, the further corneal parameters are a refractive power, in particular a ratio of a planned power correction $D_{plan}$ and the refractive power correction $D_{post}$ ascertained by the corneal deformation model, a ratio of the planned radius of the anterior interface 16 ascertained by the corneal deformation model ($R_{cap}$) and a ratio of the planned lenticule diameter ascertained by the corneal deformation model including the transition zone TZ. Besides these exemplarily shown corneal parameters, further corneal parameters can also be ascertained in the corneal deformation model, such as for example an optical distance between the anterior corneal surface and a posterior corneal surface, a thickness of the cornea, a radial distance from a limbus to a center of the cornea, an optical distance between the anterior corneal surface and an anterior interface of a lenticule to be separated, a thickness of the lenticule, a radius of curvature of the contact element, a relative thickness of the cornea and/or an incision angle of an incision cut.

As illustrated in FIG. 5, only a finite number of values is preferably ascertained, in this example 5 values or supporting points. In order to also obtain the respective intermediate values between the supporting points, a fit function, in particular a second order polynomial, can preferably be adapted to the respective values to reduce a computing effort and to obtain the entire range of values for the look-up table.

After determining the look-up table, a corneal value to be achieved can be ascertained from predetermined examination data in a step S12, which at least one of the corneal parameters is to take by the treatment with the treatment apparatus 10. The ascertainment of the corneal value from the examination data can be performed according to known methods. In addition, it can be ascertained in this step, which preoperative value the cornea 26 has for the at least one varied corneal parameter.

Subsequently, it can be ascertained in a step S14 by means of the look-up table how the corneal value or values to be achieved of the further corneal parameters have to be adapted to obtain it with the present preoperative corneal value and the deformation of the cornea 26. In particular, this can be performed by means of a respective compensation value obtained from the look-up table, by which the respective corneal values can be multiplied and/or added. Thus, the compensation value can be read from the look-up table for the corneal value to be achieved in simple manner and a user of the treatment apparatus 10 can multiply the corneal value by this compensation value or add the compensation value to compensate for the deformation.

In a fictive case, the corneal value to be achieved can for example be a refractive power correction of −5 diopters with a lenticule diameter (TZ) of 6.8 mm and a distance of 8.5 mm between an anterior corneal surface 30 and an anterior interface 16 of the lenticule 12 to be separated, wherein the cornea 26 preoperatively has a radius of curvature of the anterior corneal surface 30 of 7 mm in the non-deformed state. From the look-up table, in which the measurement results from FIG. 5 can in particular be stored, it can for example be directly read that for the −5 diopters to be achieved with a non-deformed cornea and a radius of curvature of the anterior corneal surface 30 of 7 mm, the refractive power correction $D_{plan}$ planned for it has to be multiplied by a compensation value of ca. 1.13 to compensate for the deformation. This means that a refractive power correction of −5.65 diopters is provided for the control data in this case. Correspondingly, a planned radius of the anterior interface $R_{cap}$ is multiplied by a compensation value of ca. 0.96 and a planned diameter of the lenticule 12 (TZ) is multiplied by a compensation value of ca. 0.95 to compensate for the deformation effects.

Finally, the corneal values of the respective corneal parameters adapted with the compensation value can be provided as control data for controlling the laser 18 for the control device 20 in a step S16.

Overall, the examples show how a simple and fast compensation for deformation effects can be achieved by means of the look-up table.

What is claimed is:

1. A method for providing control data for a laser of a treatment apparatus for a correction of a cornea of a human or animal eye, wherein the method comprises the following steps performed by a control device:
   determining a look-up table for preset corneal parameters using a corneal deformation model for compensating for a deformation of the cornea, wherein the cornea can be modeled in a deformed state and a non-deformed state by the corneal deformation model, wherein a value of at least one preset corneal parameter in the non-deformed state of the cornea is varied and an effect of this variation on values of the corneal parameters in the deformed state of the cornea is ascertained for determining the look-up table;
   ascertaining a corneal value to be achieved from predetermined examination data, which at least one of the preset corneal parameters is to take by a treatment with the treatment apparatus, and a preoperative value of the at least one preset and varied corneal parameter, which the cornea to be treated has in the non-deformed state before the treatment;
   determining a deformation-corrected corneal value to be achieved for at least the one preset corneal parameter, which is required for generating the corneal value to be achieved considering the deformation of the cornea, depending on the look-up table and the preoperative value of the at least one preset and varied corneal parameter; and
   providing control data for controlling the laser, which uses at least the deformation-corrected corneal value to be achieved of the at least one preset corneal parameter for correcting the cornea.

2. The method according to claim 1, wherein the corneal deformation model is based on the Euler-Bernoulli beam theory.

3. The method according to claim 1, wherein the value of the at least one preset corneal parameter is varied within a preset range of values for determining the look-up table, wherein the range of values comprises default values of the corneal parameter.

4. The method according to claim 1, wherein a fit function, in particular a second order polynomial, is adapted to the ascertained values of the respective corneal parameters for determining the look-up table.

5. The method according to claim 1, wherein the corneal parameters include a radius of curvature of an anterior corneal surface and/or an optical distance between the anterior corneal surface and a posterior corneal surface and/or a thickness of the cornea and/or a radial distance from a limbus to a center of the cornea and/or an optical distance between the anterior corneal surface and an anterior interface of a lenticule to be separated and/or a radius of the anterior interface of the lenticule to be separated and/or a transition zone and/or a thickness of the lenticule and/or a planned refractive power correction and/or a radius of curvature of a contact element and/or a relative thickness of the cornea and/or an incision angle of an incision cut.

6. The method according to claim 1, wherein a planned refractive power correction and/or a planned lenticule diameter are adapted by the look-up table.

7. The method according to claim 1, wherein a compensation value is provided from the deformed and non-deformed state of the cornea by the look-up table for each corneal parameter, wherein the respective corneal parameters are multiplied and/or added by means of the compensation value for determining the respective corneal values for compensating for the deformation of the cornea.

8. The method according to claim 1, wherein a deformation of the cornea, which is generated by a contact element, is compensated for by means of the look-up table, and/or wherein a deformation of the cornea, which is generated upon closing the cornea after removal of a lenticule from the cornea, is compensated for by means of the look-up table.

9. A control device, which is configured to perform a method according to claim 1.

10. A treatment apparatus with at least one eye surgical laser for separation of a lenticule with predefined interfaces from a human or animal eye by cavitation bubbles and with at least one control device according to claim 9.

11. The treatment apparatus according to claim 10, wherein the at least one eye surgical laser is suitable to emit laser pulses in a wavelength range between 300 nm and 1400 nm, at a respective pulse duration between 1 fs and 1 ns, and a repetition frequency of greater than 10 kHz.

12. The treatment apparatus according to claim 10, wherein the control device comprises at least one storage device for at least temporary storage of at least one control dataset, wherein the control dataset or datasets include(s) control data for positioning and/or for focusing individual laser pulses in the cornea; and includes at least one beam device for beam guidance and/or beam shaping and/or beam deflection and/or beam focusing of a laser beam of the at least one eye surgical laser.

13. A non-transitory computer-readable medium, on which a computer program is stored, the computer program includes commands that cause the control device according to claim 9 to execute the method.

* * * * *